(12) United States Patent
Cheng et al.

(10) Patent No.: US 10,447,361 B2
(45) Date of Patent: Oct. 15, 2019

(54) HIERARCHICAL BEAMFORMING METHOD AND SYSTEM THEREOF

(71) Applicant: NATIONAL TAIWAN UNIVERSITY, Taipei (TW)

(72) Inventors: Hung-Yi Cheng, Taipei (TW); An-Yu Wu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 15/845,776

(22) Filed: Dec. 18, 2017

(65) Prior Publication Data

US 2019/0140713 A1  May 9, 2019

(30) Foreign Application Priority Data

Nov. 3, 2017 (TW) .............................. 106138168 A

(51) Int. Cl.
*H04B 7/0456* (2017.01)
*H04B 7/06* (2006.01)
*H04B 7/08* (2006.01)

(52) U.S. Cl.
CPC ......... *H04B 7/0473* (2013.01); *H04B 7/0617* (2013.01); *H04B 7/086* (2013.01)

(58) Field of Classification Search
CPC .. H04B 7/0476; H04B 7/0617; H04B 7/0413; H04B 7/0456; H04B 7/0408; H04B 7/0473; H04B 7/086; H04L 25/0204
See application file for complete search history.

(56) References Cited

U.S. PATENT DOCUMENTS 9,362,997 B2 *  6/2016  Kim ..................... H04B 7/0456
2016/0165583 A1 *  6/2016  Ho ....................... H04B 7/0408
                                                             370/329

* cited by examiner

*Primary Examiner* — Betsy Deppe
(74) *Attorney, Agent, or Firm* — Muncy, Geissler, Olds & Lowe, P.C.

(57) ABSTRACT

A hierarchical beamforming method is provided, which comprises the following steps. Firstly, the vectors of the transmitter and the receiver are hierarchically indexed by using the codebooks with different coding methodology to generate hierarchical coding structures. Then, the corresponding vector fields between the transmitter and the receiver are switched according to the hierarchical coding structures. Thereafter, at least two aligning vector fields with greatest gain are detected. Finally, the corresponding aligning index pairs are used to build the channels.

10 Claims, 23 Drawing Sheets

Index: 0 2 4 6 1 3 5 7

HIERARCHICAL BEAMFORMING METHOD AND SYSTEM THEREOF

This application claims the benefit of Taiwan Patent Application Serial No. 106138168, filed Nov. 3, 2017, the subject matter of which is incorporated herein by reference.

BACKGROUND OF INVENTION

1. Field of the Invention

The present invention is related to a hierarchical beamforming method and a system thereof, and more particularly is related to the hierarchical beamforming method which defines the transmitter vectors and the receiver vectors by using the codebooks with different coding methodologies respectively, and the system thereof.

2. Description of the Prior Art

Attending with the progress of technology, mobile communication devices, such as cell phones and tablets, have become more and more popular, which makes human life more convenient. In recent years, the rise of virtual reality (VR) and augmented reality (AR) also brings the challenge which mobile communication needs to face.

Wireless communication of the present communication devices is achieved by using antenna. To enhance the communication speed, the technology has evolved to millimeter wave (mmWave) communication. In order to achieve high spectral efficiency, mmWave communication usually accompanies the usage of multi-channel communication technology, i.e. several data streams are transmitted/received simultaneously in the communication system. In addition, in order to achieve the target of low latency communication, the communication system must use the channel estimation technology to access channel state information (CSI) of these channels.

The present channel estimation technology uses the codebook to define the indexes of the vectors or the antennas of the transmitter and the receiver. The transmitter transmits signals according to the order of the index of the codebook, the receiver receives the signals according to the order of the index of the codebook and finds out the one with greatest power, and the corresponding indexes is used to establish channels for following communication.

FIG. 1 is a schematic view showing a conventional multi-channel beamforming technology, and the beamforming progress to identify four channels is shown. FIG. 2 is a schematic view showing the channel estimation technology used in the beamforming progress. The arrow in FIG. 2 indicates the estimation route of the first channel estimation process, and the labels $1^{st}$ to $4^{th}$ indicate the four channels found in four consecutive channel estimation processes.

The channel estimation technology shown in FIG. 2 uses a hierarchical codebook to hierarchically identify the vector fields of the transmitter according to the indexes of the codebook. During the channel estimation process, firstly, two vector fields of the uppermost level are detected and the one with greater gain is selected; then, the process moves forward to the next level to divide the selected vector field into two sub-vector fields, and find out the one with greater gain; and so on until reaching the last level. The manner of the channel estimation process is similar to a tree searching strategy to search the channel with greatest signal strength. After repeating the aforementioned channel estimation process several times, multiple estimated channels can be accessed (i.e. corresponding to the progress from the left to the right in FIG. 1).

However, in responsive to the demand of ultra-low latency and the requirement of high resolution channel estimation, conventional beamforming method cannot detect all the channels under the restriction of limited training time and some channels must be skipped. On the other hand, as the conventional beamforming method is applied to multi-channel estimation, a greater latency would be resulted, for example, when the technology is applied to video streaming, the problem of poor image quality would be resulted. Thus, there exists the need to improve the conventional technology.

SUMMARY OF THE INVENTION

In view of the aforementioned drawbacks of the conventional beamforming method, a main object of the present invention is to provide a hierarchical beamforming method, which hierarchically defines the indexes of the transmitter vectors and the receiver vectors by using the codebooks with different coding methodology respectively to generate hierarchical coding structures for proceeding the channel estimation process, and at least two aligning vector fields with greatest gain and the corresponding aligning index pair are found in each channel estimation step so as to shorten the time needed for channel estimation process and reduce latency.

A hierarchical beamforming method is provided in the present invention. The method is applied to a wireless communication system, which includes a transmitter and a receiver. The method comprises the steps as below.

Firstly, a plurality of transmitter vectors of the transmitter is hierarchically indexed according to a first vector codebook to generate a transmitter hierarchical coding structure, and a plurality of receiver vectors of the receiver is hierarchically indexed according to a second vector codebook to generate a receiver hierarchical coding structure. The coding methodology of the second vector codebook is different from that of the first vector codebook.

Thereafter, in the channel estimation step, the corresponding vector fields of the transmitter and the receiver are switched according to the transmitter hierarchical coding structure and the receiver hierarchical coding structure generated by the aforementioned first vector codebook and the second vector codebook respectively, and the corresponding gains are detected by using the receiver.

Thereafter, at least two pairs of aligning vector fields with greatest gains are identified among the gains detected by the receiver. Each of the pairs of the vector fields has a corresponding aligning index pair, which includes an index of the transmitter hierarchical coding structure and an index of the receiver hierarchical coding structure.

Finally, these aligning index pairs are stored for establishing channels.

In accordance with an embodiment of the hierarchical beamforming method of the present invention, after the step of finding the aligning vector fields and the aligning index pairs, the following steps are executed for determining whether these aligning index pairs should be used for establishing channels.

Firstly, a determination step is carried out to determine whether the channel estimation step has reached the maximum level of the transmitter hierarchical coding structure and/or that of the receiver hierarchical coding structure. If the channel estimation step has reached the maximum level, which indicates that the channel estimation step has reached channel resolution, the aligning index pairs would be stored for establishing channels. If the channel estimation step has not reached the maximum level, which indicates that the channel estimation step has not reached the channel resolution, the channel estimation step would be further applied to the vector fields corresponding to the aforementioned aligning index pairs, and within the vector fields corresponding to the aligning index pairs, the corresponding vector fields of the transmitter and the receiver would be switched according to the following level of the transmitter hierarchical coding structure and the receiver hierarchical coding structure to figure out at least two pairs of aligning vector fields with greatest gains and the corresponding aligning index pairs.

In accordance with an embodiment of the present invention, after the step of finding the aligning vector fields and the aligning index pairs, the following steps can be executed for fully utilizing the training time to enhance spectral efficiency.

Firstly, a determination step is executed to determine whether the time spent by the channel estimation step reaches a predetermined time limit. The aforementioned channel estimation step includes the step of switching the corresponding vector fields of the transmitter and the receiver and the step of finding the aligning vector fields and the corresponding aligning index pairs. If the spent time has reached the predetermined time limit, the present aligning index pairs would be used for establishing channels. If the spent time has not reached the predetermined time limit, i.e. some remaining time is still left for doing the training step, then, after excluding the aligning vector fields found in the previous step, the channel estimation step would be repeated again to switch the corresponding vector fields of the transmitter and the receiver according to the transmitter hierarchical coding structure and the receiver hierarchical coding structure to figure out the aligning vector fields and the corresponding aligning index pairs.

In accordance with an embodiment of the present invention, after the step of finding the aligning vector fields and the aligning index pairs, the following steps can be used to prevent additional latency.

Firstly, a determination step is carried out to determine whether an aligning index pair output signal has been received by the transmitter or the receiver. If the aligning index pair output signal has been received, these aligning index pairs would be outputted for establishing channels. If the aligning index pair output signal has not been received, the step for determining whether the channel estimation step has reached the maximum level of the transmitter hierarchical coding structure and/or the transmitter hierarchical coding structure would be further executed to decide whether the present aligning index pair would be used to establish channels.

In accordance with an embodiment of the present invention, the transmitter vectors of the transmitter composes a transmitter circular vector field, and the receiver vectors of the receiver composes a receiver circular vector field.

In accordance with an embodiment of the present invention, the coding methodologies of the aforementioned first vector codebook and the second vector codebook are selected from the group composed of bit-reversal order, even-odd order, consecutive order, and random. As a preferred embodiment, the first vector codebook adopts the coding methodology of bit-reversal order, or the second vector codebook adopts the coding methodology of bit-reversal order.

In accordance with an embodiment of the present invention, the aforementioned transmitter hierarchical coding structure and the receiver hierarchical coding structure generated by the first vector codebook and the second vector codebook respectively are partitioned according to a partition parameter, and as a preferred embodiment, the partition parameter is 2.

In accordance with an embodiment of the present invention, each of the transmitter vectors defined at the transmitter is corresponding to a transmitter antenna, and each of the receiver vector defined at the receiver is corresponding to a receiver antenna.

The present invention will be specified with reference to the following embodiments and the drawings.

BRIEF DESCRIPTION OF THE DRAWINGS

FIG. 4A is a schematic view of a transmitter hierarchical coding structure in accordance with a preferred embodiment of the present invention.

FIG. 8A is a schematic view of a receiver hierarchical coding structure in accordance with a first embodiment of the present invention.

FIG. 8B is a schematic view of a receiver hierarchical coding structure in accordance with a second embodiment of the present invention.

FIG. 8C is a schematic view of a receiver hierarchical coding structure in accordance with a third embodiment of the present invention.

DESCRIPTION OF THE PREFERRED EMBODIMENT

Figure 3:
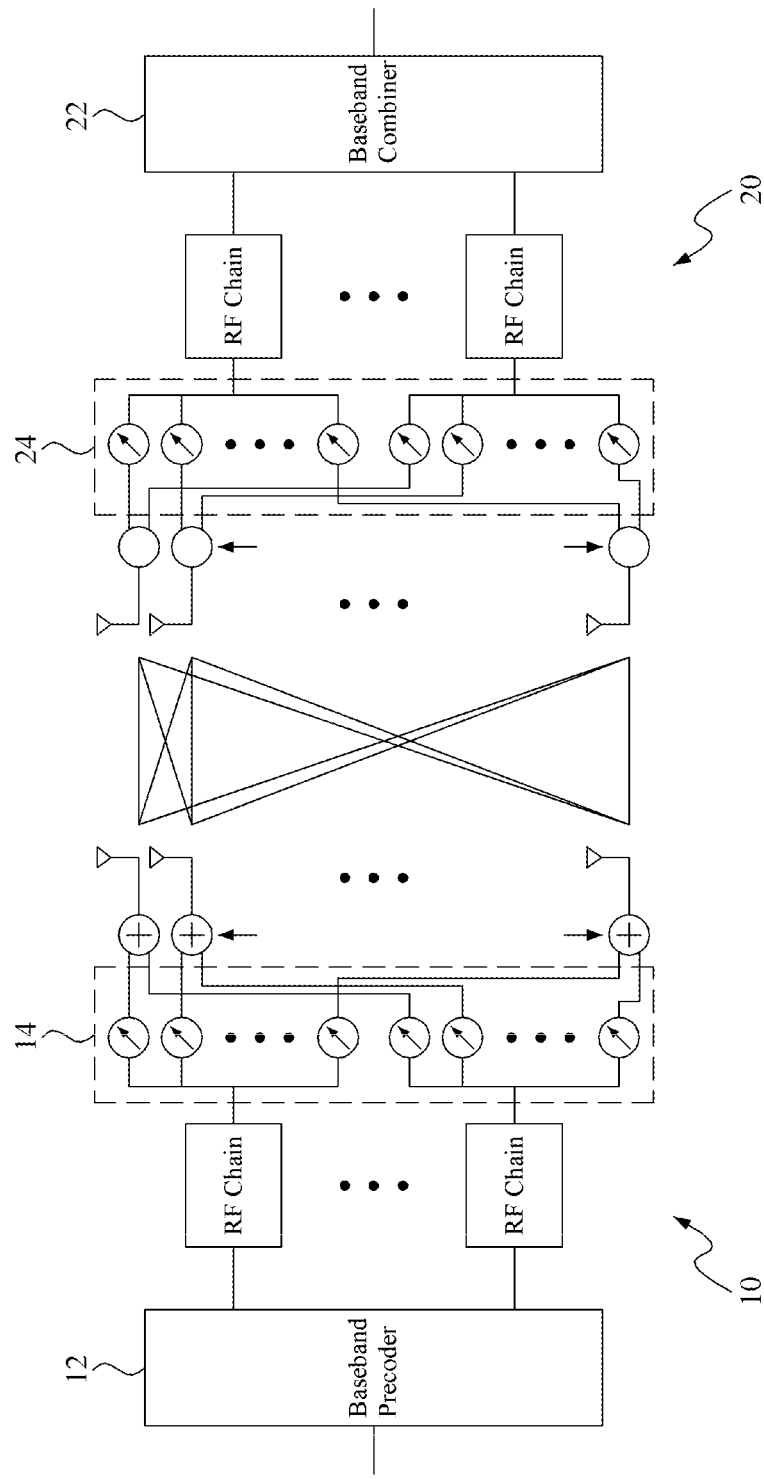
FIG. 3 is a block diagram showing a typical mmWave multi-input multi-output (MIMO) wireless transmission system.

FIG. 3 is a block diagram showing a typical mmWave MIMO wireless communication system, which uses hybrid analog/digital structure at both the transmitter 10 and the receiver 20 thereof. The transmitter 10 is equipped with a plurality of transmitter antennas, and the receiver 20 is equipped with a plurality of receiver antennas. The transmitter 10 and the receiver 20 are communicated by using a plurality of independent data streams. The precoder of the transmitter 10 includes a baseband precoder 12 and a RF precoder 14; and similarly, the combiner of the receiver 20 includes a baseband combiner 22 and a RF combiner 24. In addition, the communication system needs to execute some training steps to access the real channel state information between the transmitter 10 and the receiver 20.

Figure 4:
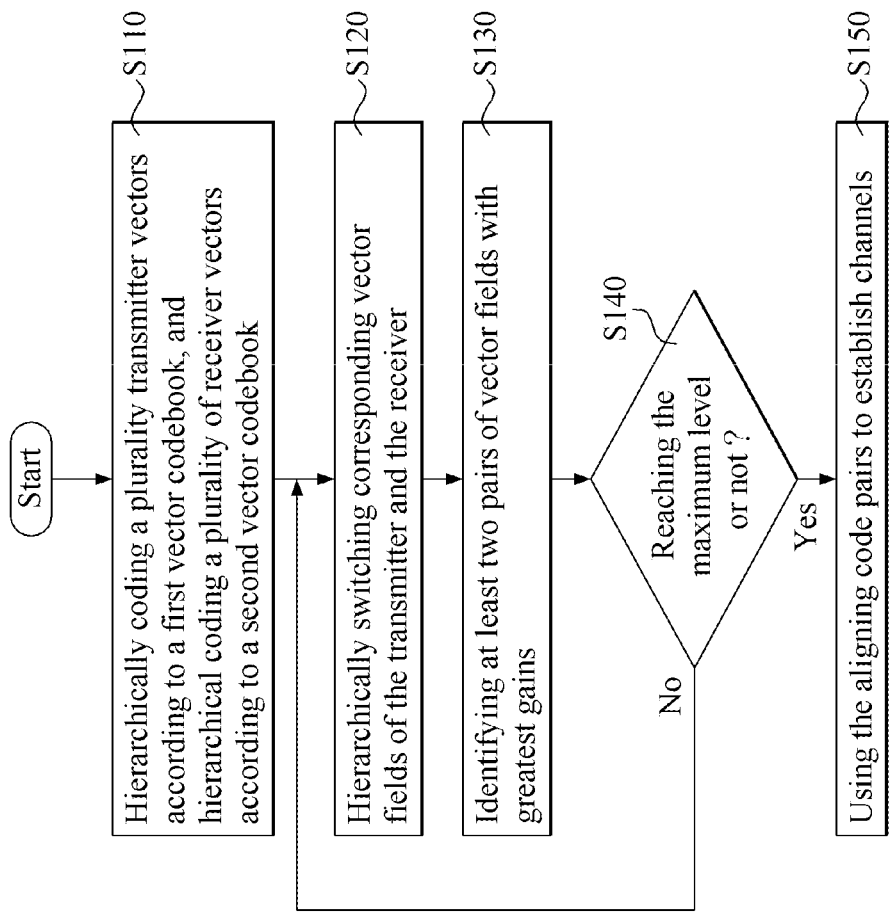
FIG. 4 is a flow chart showing a hierarchical beamforming method in accordance with a first embodiment of the present invention.

FIG. 4 is a flowchart showing the hierarchical beamforming method in accordance with a first embodiment of the present invention. The method can be applied to the MIMO wireless communication system shown in FIG. 3, but is not limited thereto. All the MIMO wireless communication systems need to know the channel state information may benefit from the technology provided in the present invention to improve spectral efficiency.

The hierarchical beamforming method provided in the present embodiment comprises the following steps.

Firstly, in step S110, a plurality of transmitter vectors of the transmitter is hierarchically coded according to a first vector codebook to generate a transmitter hierarchical coding structure, and a plurality of receiver vectors of the receiver is hierarchically coded according to a second vector codebook to generate a receiver hierarchical coding structure.

Thereafter, in step S120, the corresponding vector fields of the transmitter and the receiver are switched according to the transmitter hierarchical coding structure and the receiver hierarchical coding structure generated by the aforementioned first vector codebook and the second vector codebook respectively, and the corresponding gains are detected by using the receiver.

Then, in step S130, at least two pairs of aligning vector fields with greatest gains among the gains detected by the receiver are identified. Each pair of the aligning vector fields corresponds to an aligning index pair, which includes an index of the transmitter hierarchical coding structure and an index of the receiver hierarchical coding structure. The aforementioned steps S120 and S130 are utilized for executing channel estimation, and thus the two steps together are called the channel estimation step in the present specification.

Thereafter, in step S140, a determination step is carried out to determine whether the channel estimation step has reached the maximum level of the transmitter hierarchical coding structure and/or that of the receiver hierarchical coding structure.

If the channel estimation step has not reached the maximum level, which indicates that the channel estimation step has not reached the channel resolution, the process would go back to step S120 to execute the channel estimation step for the next level. To be more specific, the process would focus on the range defined by the at least two aligning vector fields found in the previous step S130 and execute the aforementioned steps S120 and S130 based on the following level defined in the transmitter hierarchical coding structure and the receiver hierarchical coding structure to switch the corresponding vector fields of the transmitter and the receiver, and identify at least two pairs of aligning vector fields with greatest gains and the corresponding aligning index pairs.

If the channel estimation step has reached the maximum level, which indicates that the channel estimation step has reached the channel resolution and the aligning vector fields found in the previous step cannot be further partitioned, then the process will move forward to step S150.

Finally, in step S150, the found aligning index pairs of the maximum level are used for establishing channels.

Figure 4A:
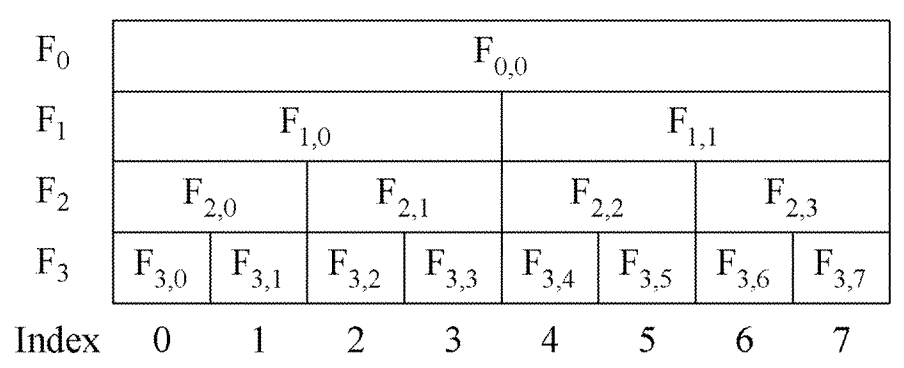

FIG. 4A is a schematic view of the transmitter hierarchical coding structure generated in the aforementioned step S110 in accordance with a preferred embodiment of the present invention. This embodiment can also be applied to the receiver hierarchical coding structure as well. As shown, the transmitter hierarchical coding structure has eight indexes (indexed as 0 to 7 from the left to the right) corresponding to eight transmitter vectors which compose four different levels $F_0$, $F_1$, $F_2$, $F_3$ in the hierarchical coding structure. As an embodiment of the present invention, each of the eight transmitter vectors defined at the transmitter may be corresponding to a transmitter antenna. In addition, as a preferred embodiment, these transmitter vectors may compose a circular vector field. The aforementioned embodiments are described for the purpose to specify the feature of present invention. The scope of the present invention is not limited thereto. Based on the arrangement of the antennas, these transmitter vectors may compose a directional vector field which is different from the aforementioned circular vector field. In addition, according to the need of wireless communication in practice, each transmitter vector may cover more than one transmitter antenna, and vice versa.

The transmitter hierarchical coding structure is partitioned according to a partition parameter. In the present embodiment, the partition parameter is 2. That is, in the hierarchical coding structure, a vector field of a previous level would be divided into two portions as the vector fields of the following level. For example, level $F_1$ has two vector fields (with respective to the transmitter vectors of indexes 0-3 and 4-7 respectively), and level $F_2$ has four vector fields (with respective to the transmitter vectors of indexes 0-1, 2-3, 4-5 and 6-7 respectively). However, the present invention is not limited thereto. The partition parameter for generating the transmitter hierarchical coding structure and the receiver hierarchical coding structure may be the other integers. For example, if the partition parameter is 3, the vector field at the transmitter can be partitioned into 9 transmitter vectors and a hierarchical coding structure with three levels can be generated.

Figure 1:
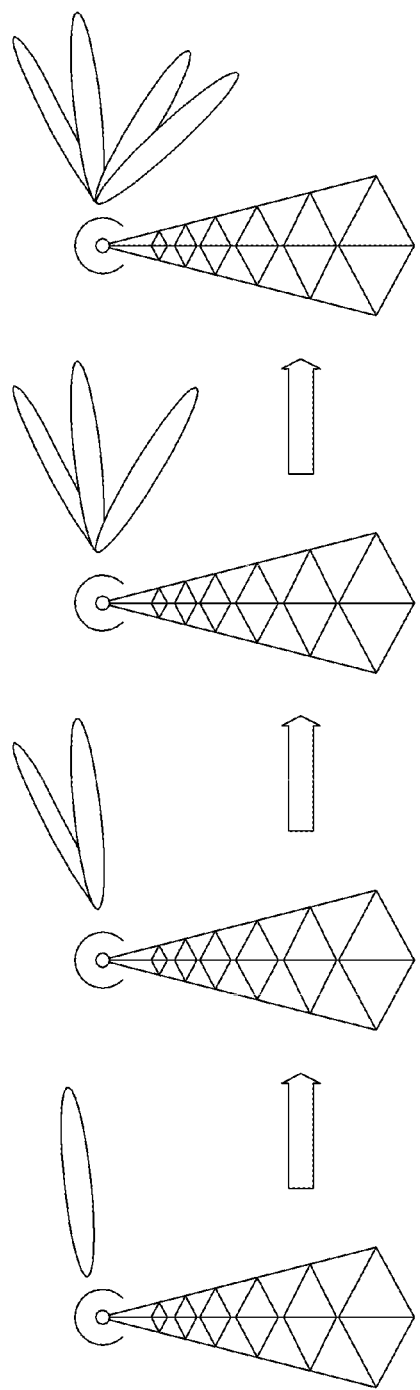
FIG. 1 is a schematic view showing a conventional multi-channel beamforming technology.
Figure 2:
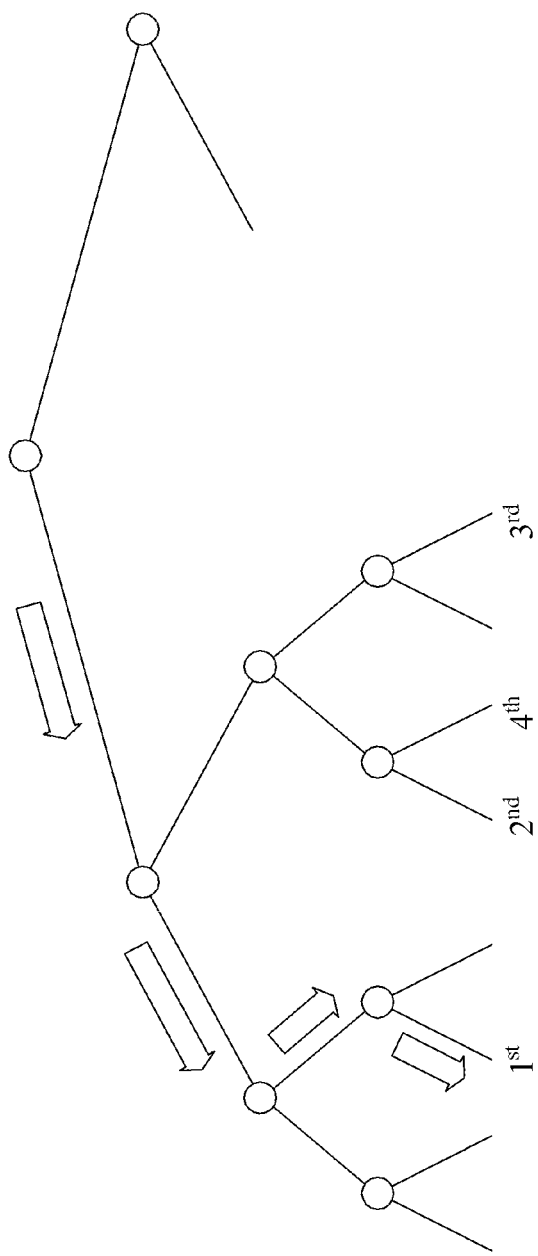
FIG. 2 is a schematic view showing a conventional channel estimation technology.
Figure 4B:
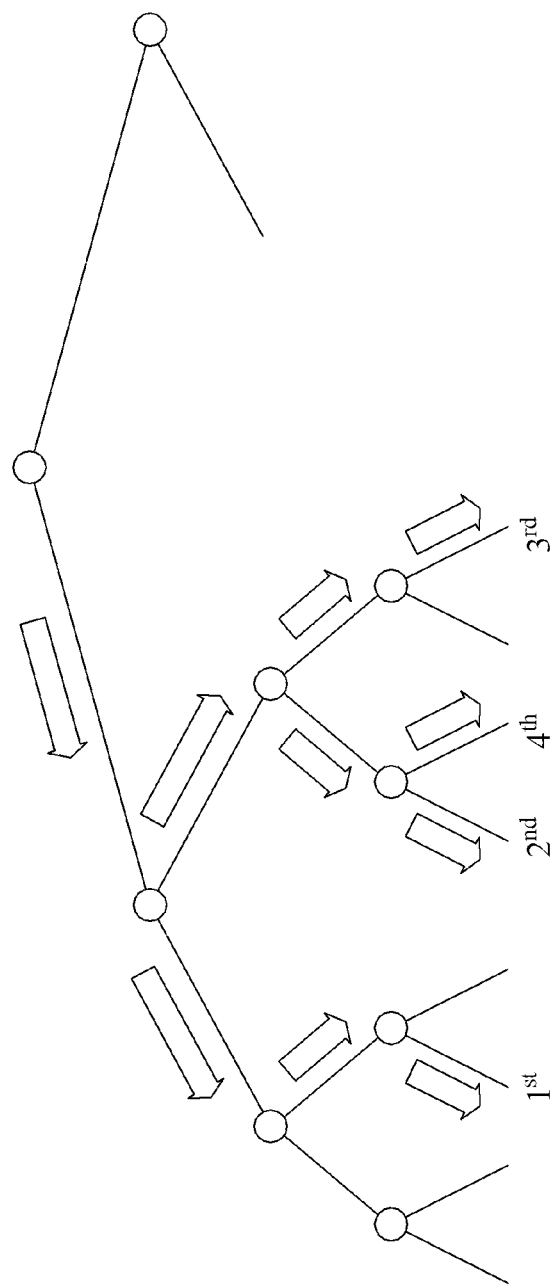
FIG. 4B is a schematic view showing a hierarchical multi-channel estimation process using the hierarchical coding structure of FIG. 4A and the method of FIG. 4 in accordance with a preferred embodiment of the present invention.

FIG. 4B is a schematic view showing a hierarchical adaptive multi-channel estimation process using the hierarchical coding structure of FIG. 4A and the method of FIG. 4 in accordance with a preferred embodiment of the present invention. Similar to the channel estimation technology of FIG. 2, the channel estimation process in the present embodiment also has the feature of a tree searching strategy to search the best aligning vector fields level by level. However, different from the channel estimation technology of FIG. 2, in which each channel estimation process can only identify one route with greatest gain (the labels $1^{st}$ to $4^{th}$ indicate four channels found in four consecutive channel estimation processes), the present embodiment identifies four routes with greatest gains (i.e. corresponding to four aligning vector fields with greatest gains) within one channel estimation process.

Figure 5:
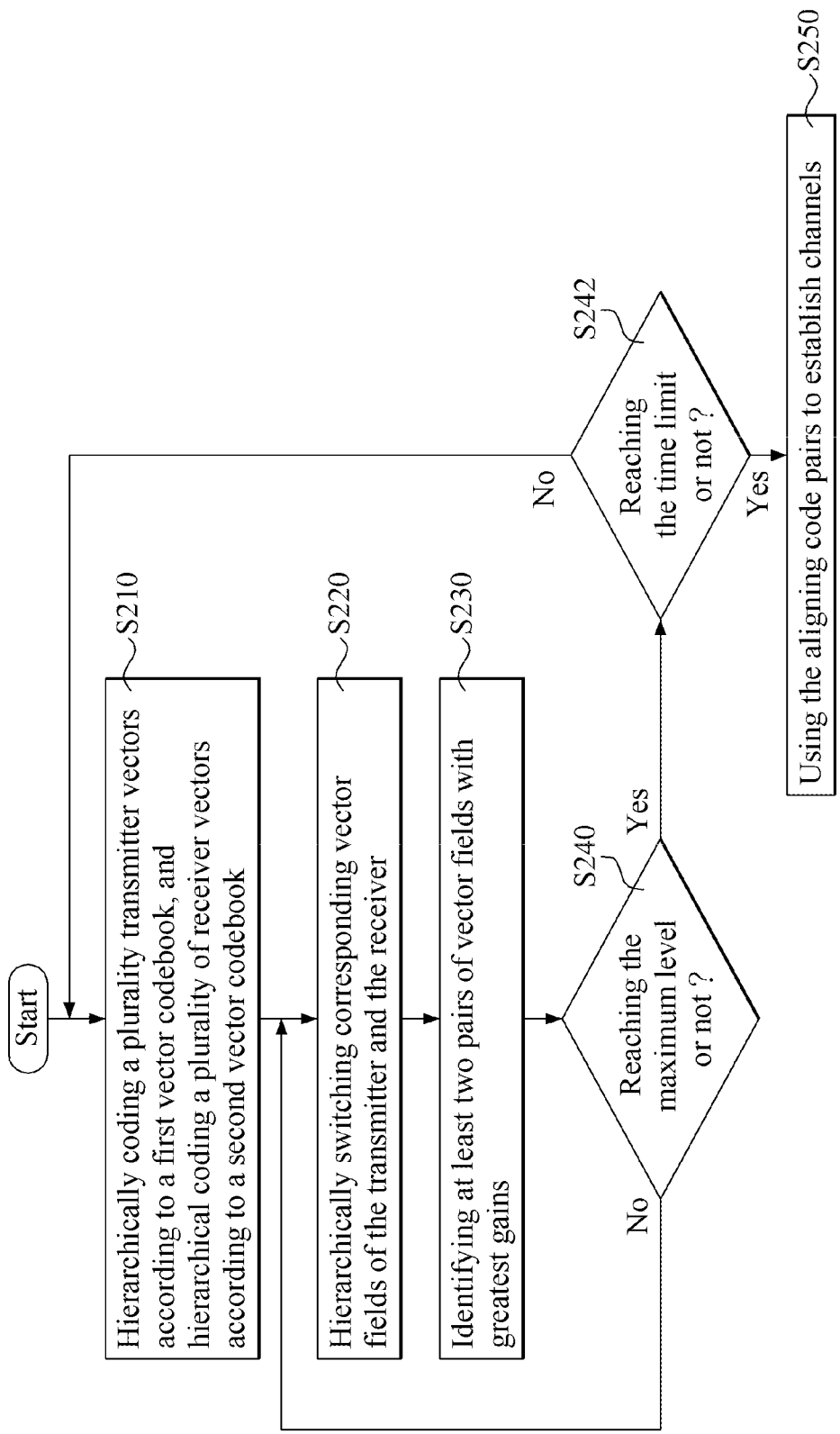
FIG. 5 is a flow chart showing a hierarchical beamforming method in accordance with a second embodiment of the present invention.

FIG. 5 is a flow chart showing a hierarchical beamforming method in accordance with a second embodiment of the present invention. Steps S210 to S250 of the present embodiment are similar to steps S110 to S150 in the first embodiment, but step S240 is different from step S140 in the first embodiment. In step S240, a determination step is carried out to determine whether the channel estimation step has reached the maximum level. If the channel estimation step has reached the maximum level, the process may move forward to step S242 rather than step S250 which establishes channels by using the found aligning index pairs directly.

In step S242, the process determines whether the time spent by the channel estimation step has reached a predetermined time limit (i.e. the time limit for training steps). The aforementioned channel estimation step includes the step of switching the corresponding vector fields of the transmitter and the receiver and the step of identifying the aligning vector fields and the corresponding aligning index pairs.

If the spent time has reached the predetermined time limit, the process will move forward to step S250 to use the present aligning index pairs for establishing channels. If the spent time has not reached the predetermined time limit, i.e. some remaining time is still available for doing the training step, then, the identified aligning index pairs would be stored and the process would go back to step S220 to repeat the channel estimation step (i.e. to switch the corresponding vector fields of the transmitter and the receiver to figure out the aligning vector fields and the corresponding aligning index pairs) according to the transmitter hierarchical coding structure and the receiver hierarchical coding structure after excluding the aligning vector fields found in the previous steps. Please refer to FIG. 7E to FIG. 7H for the detail of step S242.

The hierarchical beamforming method of the present embodiment adds a time limit determination step S242 after identifying the aligning vector fields of the maximum level and the corresponding aligning index pairs in step S240, which is helpful for fully utilizing available training time to do the training steps to enhance channel estimation accuracy and spectral efficiency.

Figure 6:
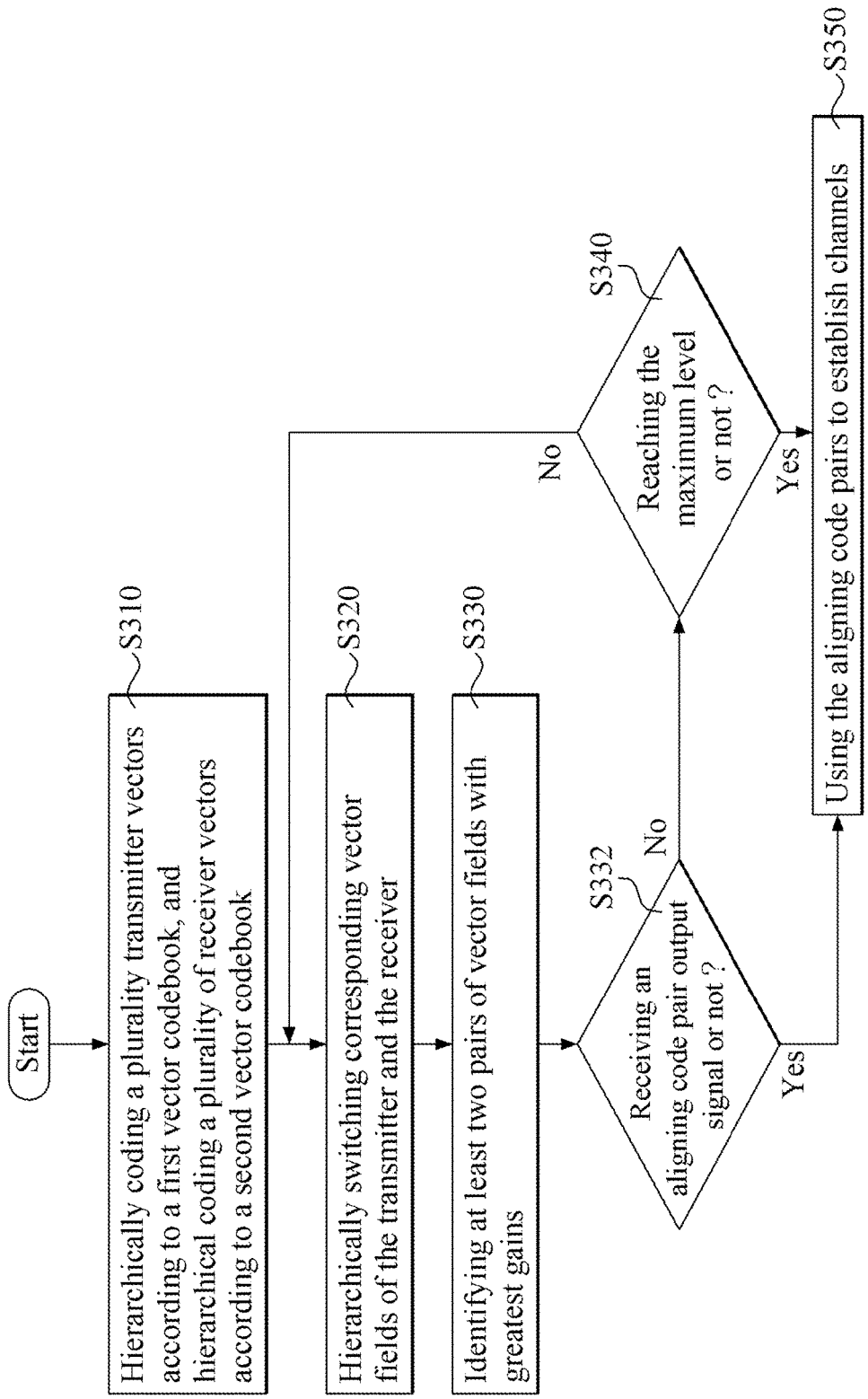
FIG. 6 is a flow chart showing a hierarchical beamforming method in accordance with a third embodiment of the present invention.

FIG. 6 is a flow chart showing a hierarchical beamforming method in accordance with a third embodiment of the present invention. Steps S310 to S350 of the present embodiment are similar to steps S110 to S150 in the first embodiment, but a determination step S332 is interposed between step S330 and step S340 to decide whether the step S340 should be passed and the process should move forward to step S350 directly.

To be more precisely, in the step S332, the process may determine whether the transmitter or the receiver has received an aligning index pair output signal or not. The aligning index pair output signal can be a wired signal or a wireless signal, and the aligning index pair output signal can also be a trigger signal generated by a timer.

If the transmitter or the receiver has received the aligning index pair output signal, the process may move forward to step S350 to establish channels by using the aligning index pairs which have been identified in the previous steps. If the transmitter or the receiver has not yet received the aligning index pair output signal, the process may move forward to step S340 to check whether the channel estimation step has reached the maximum level of the transmitter hierarchical coding structure and/or receiver hierarchical coding structure or not to decide whether these aligning index pairs should be used for establishing channels.

That is, after the at least two aligning index pairs had been identified, the transmitter and/or the receiver may check whether the process should be stopped and output the present aligning index pairs directly rather than move forward to step S340 for doing following determination and possibly some additional channel estimation steps. Thereby, this embodiment may prevent the channel estimation step from spending too much time to result in latency.

FIG. 7A to FIG. 7H are schematic views showing the channel power domain defined by the transmitter index and the receiver index to describe the hierarchical multi-channel estimation process from step S220 to step S242 in FIG. 5 in accordance with an embodiment of the present invention, wherein the channel power domains shown in FIG. 7A to FIG. 7D also correspond to step S120 to S140 in FIG. 4.

Figure 7A:
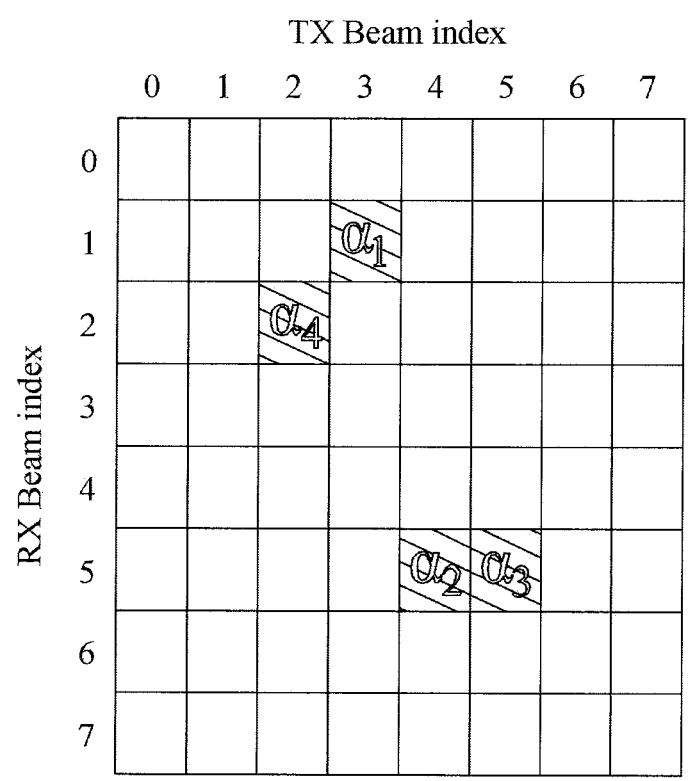
FIG. 7A to FIG. 7H are schematic views of the channel power domains defined by the transmitter index and the receiver index to describe the hierarchical multi-channel estimation process in accordance with an embodiment of the present invention.
Figure 7B:
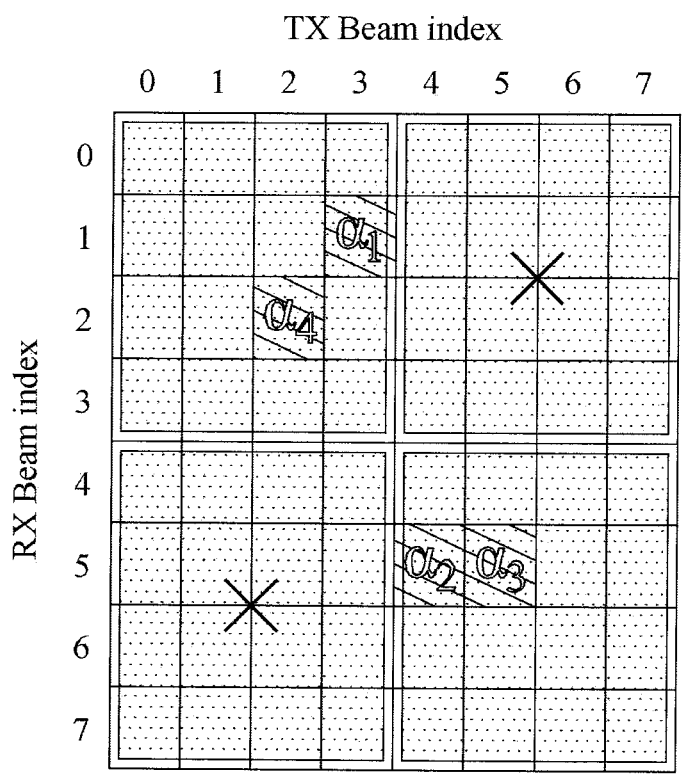

As shown in FIG. 7A, assume the four aligning index pairs a1, a2, a3, a4 with greatest gains correspond to the transmitter indexes 3, 4, 5, 2 and the receiver indexes 1, 5, 5, 2 respectively. As shown in FIG. 7B, the first level channel estimation step (S=1) of the channel estimation process is to identify two pairs of aligning vector fields with greatest gains (i.e. the vector fields corresponding to the left upper region and the right lower region in the figure) among these sets of aligning vector fields.

Figure 7C:
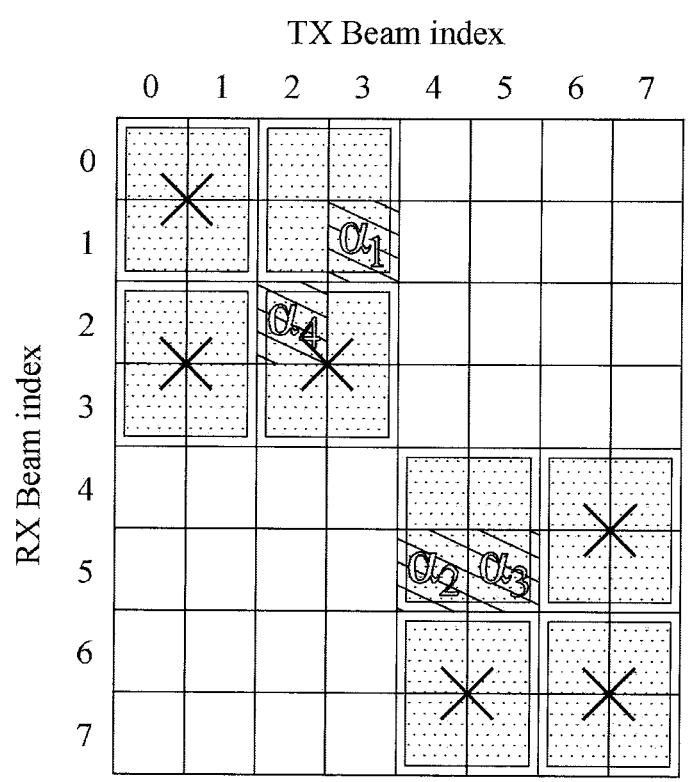

Then, as shown in FIG. 7C, the channel estimation process may execute the second level (S=2) channel estimation step within the two sets of aligning vector fields with greatest gains, and each set of aligning vector fields would be further partitioned into four sets of aligning vector fields, and the second level channel estimation step is to identify two sets of aligning vector fields with greatest gains among these sets of aligning vector fields.

Figure 7D:
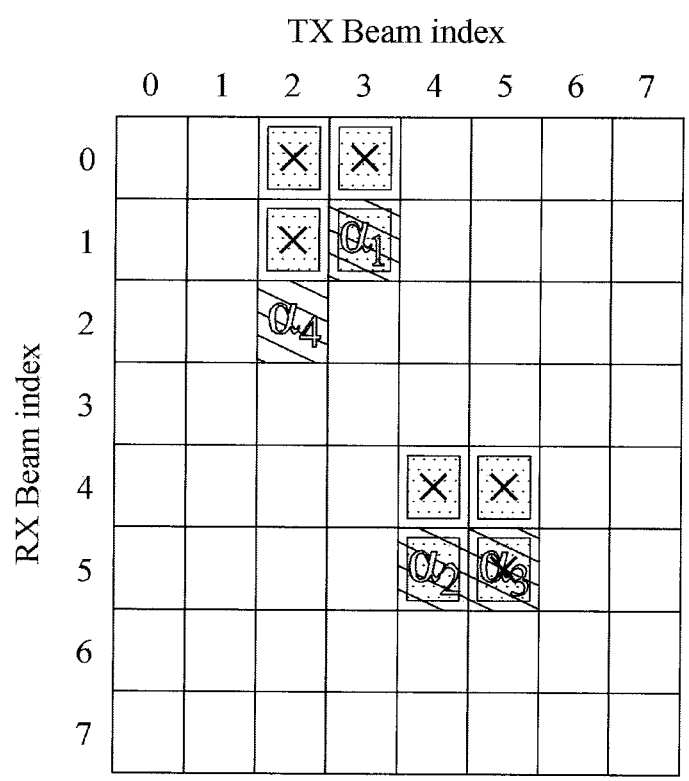

Then, as shown in FIG. 7D, the channel estimation process adopts a similar method to execute the third level (S=3) channel estimation step, i.e. to further partition the aligning vector fields identified in FIG. 7C into four sets of aligning vector fields, and identify two aligning vector fields with greatest gains among these sets of aligning vector fields. After these steps, two aligning index pairs a1 and a2 with greatest gains can be found.

The aforementioned embodiment describes the channel estimation process applied to the communication system with 8 transmitter vectors and 8 receiver vectors, and two better aligning index pairs are identified in each channel estimation process to reduce the time needed for accessing channel state information of multiple channels. However, the present invention is not limited thereto. According to the need in practice, the process described in the present embodiment may be modified to identify more aligning index pairs in one single channel estimation process for establishing channels.

Figure 7E:
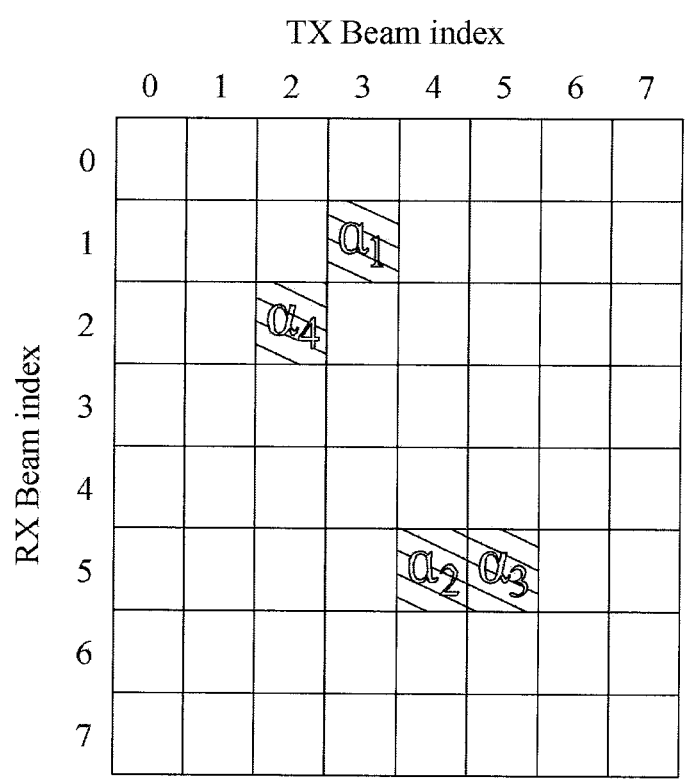

In addition, if some remaining time is still available for channel estimation after completing the channel estimation process from FIG. 7B to FIG. 7D, then, as shown in FIG. 7E, the channel estimation process of the present embodiment will exclude the aligning index pairs a1 and a2 identified in the step of FIG. 7D first and repeat the channel estimation steps from level one to level three.

Figure 7F:
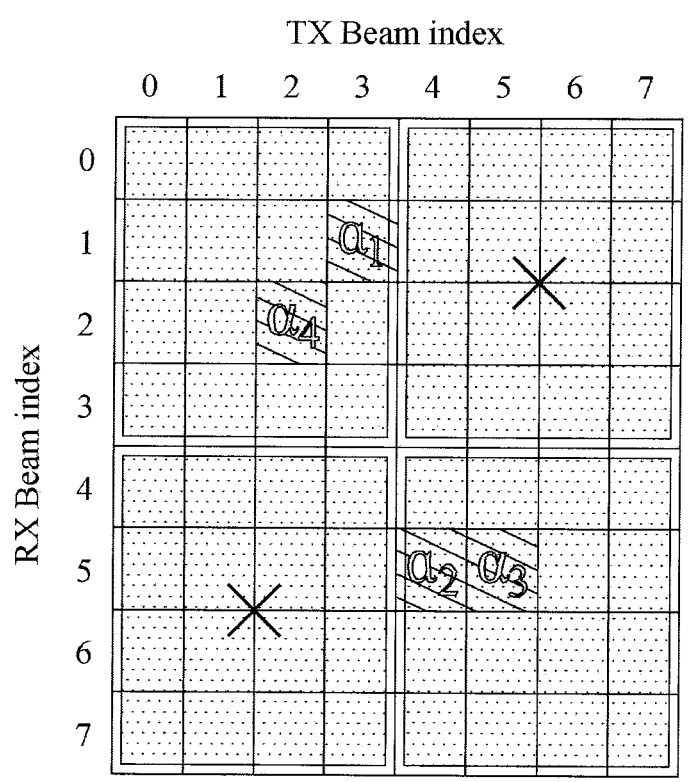

As shown in FIG. 7F, the first level channel estimation step is carried out. This step is similar to the step described in FIG. 7B, which identifies two sets of aligning vector fields with greatest gains among four sets of aligning vector fields. It is noted that because a3 and a4 are within the left upper region and the right lower region in the channel power domain, the two sets of aligning vector fields with greatest gains would be also corresponding to the left upper region and the right lower region in the figure.

Figure 7G:
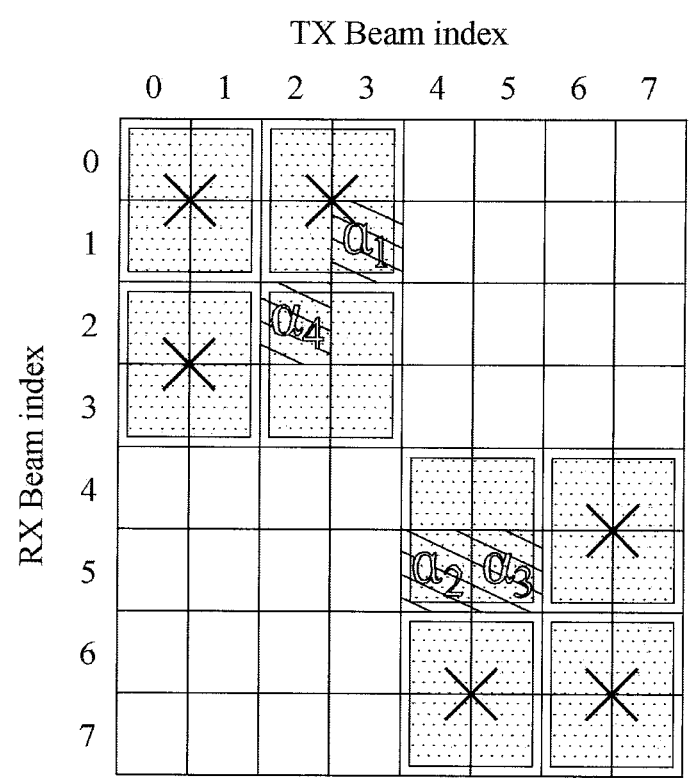

Then, as shown in FIG. 7G the second level channel estimation step is carried out. This step is similar to the step described in FIG. 7C. However, because the aligning index pairs a1 and a2 have been excluded in advance, the regions corresponding to the two sets of aligning vector fields identified in the present step is different from the regions identified by the step of FIG. 7C.

Figure 7H:
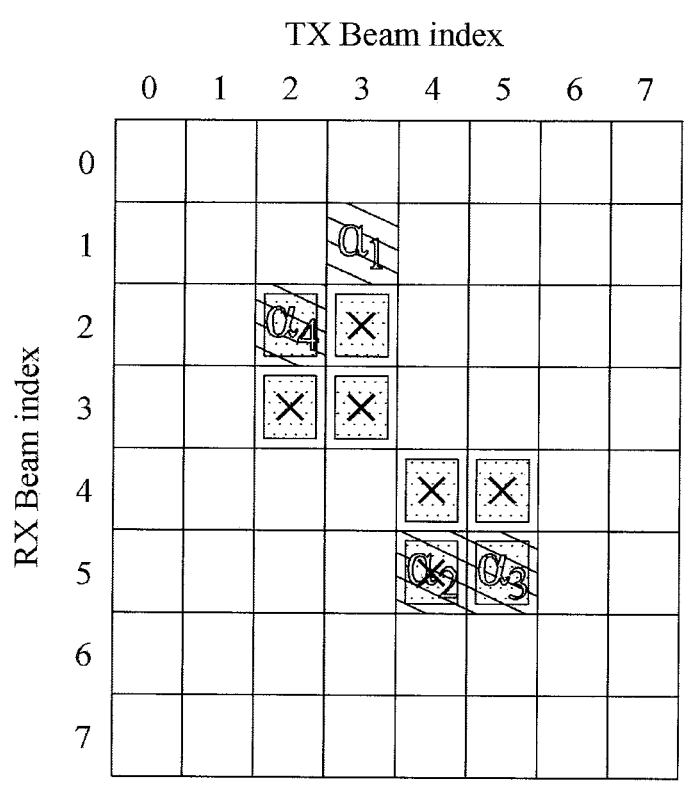

Thereafter, as shown in FIG. 7H, the third level channel estimation step is carried out. This step is similar to the step described in FIG. 7D. This step may further partition the vector fields corresponding to each of the regions identified in FIG. 7G into four sets of aligning vector fields, and identify two sets of aligning vector fields with greatest gains among these sets of aligning vector fields. After these steps, two additional aligning index pairs a3 and a4 with greater gains would be identified.

Figure 8A:
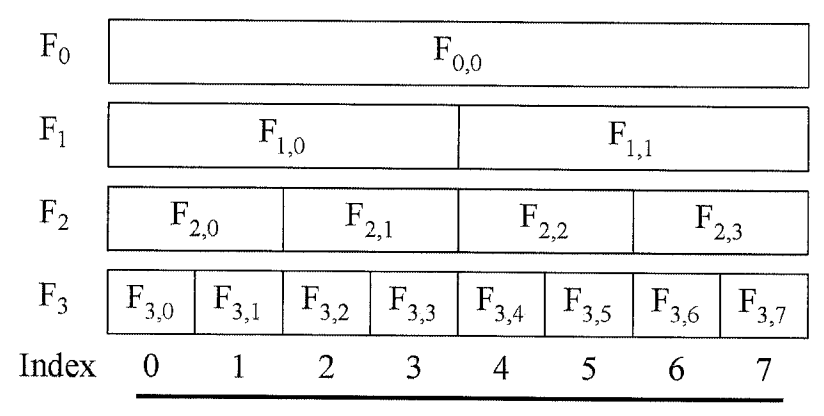
Figure 8C:
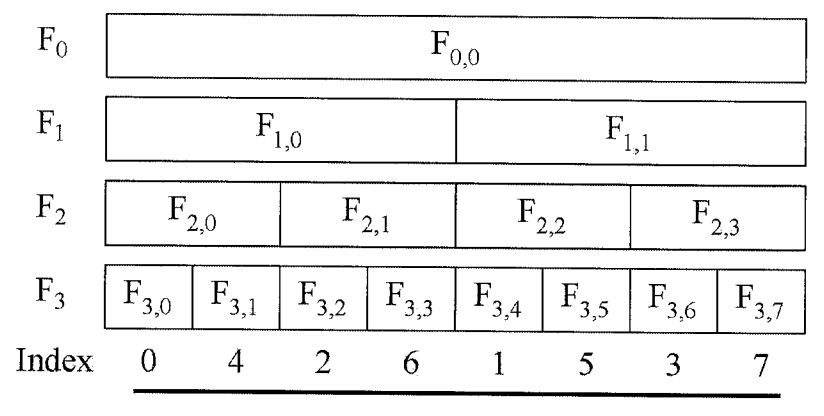

FIG. 8A to FIG. 8C are schematic views showing the receiver hierarchical coding structure in accordance with first, second, and third embodiments of the present invention, which describe the coding methodologies of consecutive order, even-odd order, and bit-reversal order respectively. Consecutive order indicates that the order of the indexes is identical to the order of the index numbers. Even-odd order is to arrange the indexes by separating the even index numbers and the odd index numbers. In the embodiment of FIG. 8B as shown, the odd index numbers are placed in advance, and the even index numbers are placed behind.

Bit-reversal order indicates that the order of the indexes is defined by reversing the bits of the binary codes corresponding to numbers 0 to 7 as shown in the following Table. Take the index number 3 as an example, index number 3 would be ranked $4^{th}$ in consecutive order (after the index numbers 0, 1, and 2), and the binary code of index number 3 is [011]. After reversing the bits of the binary code [011], the bit-reversal binary code [110] is generated, which corresponds to the index number 6. Thus, in bit-reversal order in FIG. 8C, the index number ranked $4^{th}$ is 6. Based on the aforementioned method, the index numbers in bit-reversal order can be generated.

| Index number in consecutive order | Binary code | Bit-reversal of binary code | Index number in bit-reversal order |
|---|---|---|---|
| 0 | 000 | 000 | 0 |
| 1 | 001 | 100 | 4 |
| 2 | 010 | 010 | 2 |
| 3 | 011 | 110 | 6 |
| 4 | 100 | 001 | 1 |
| 5 | 101 | 101 | 5 |
| 6 | 110 | 011 | 3 |
| 7 | 111 | 111 | 7 |

Figure 8D:
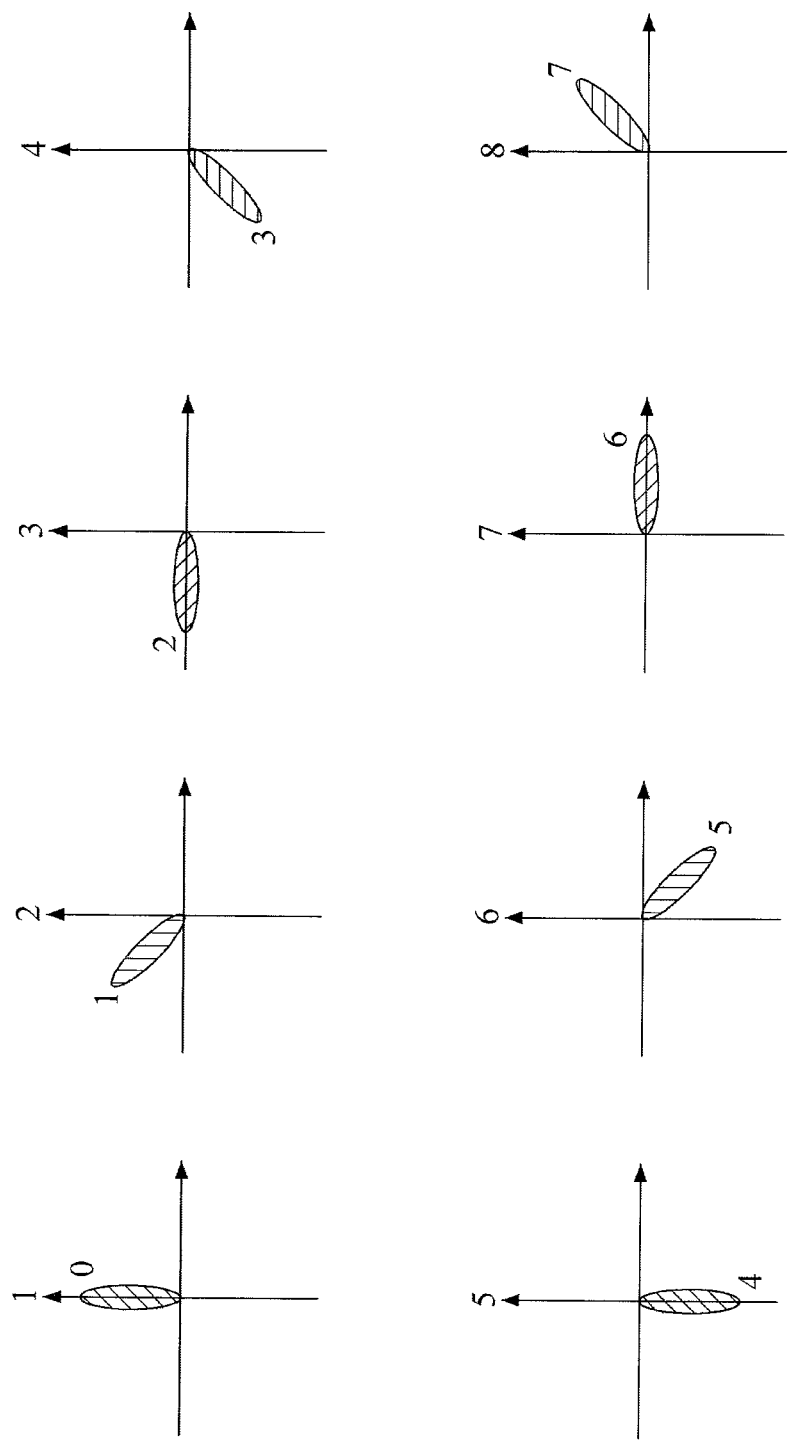
FIG. 8D is a schematic view showing the vector codebook indexed in consecutive order by using the circular vector field.
Figure 8E:
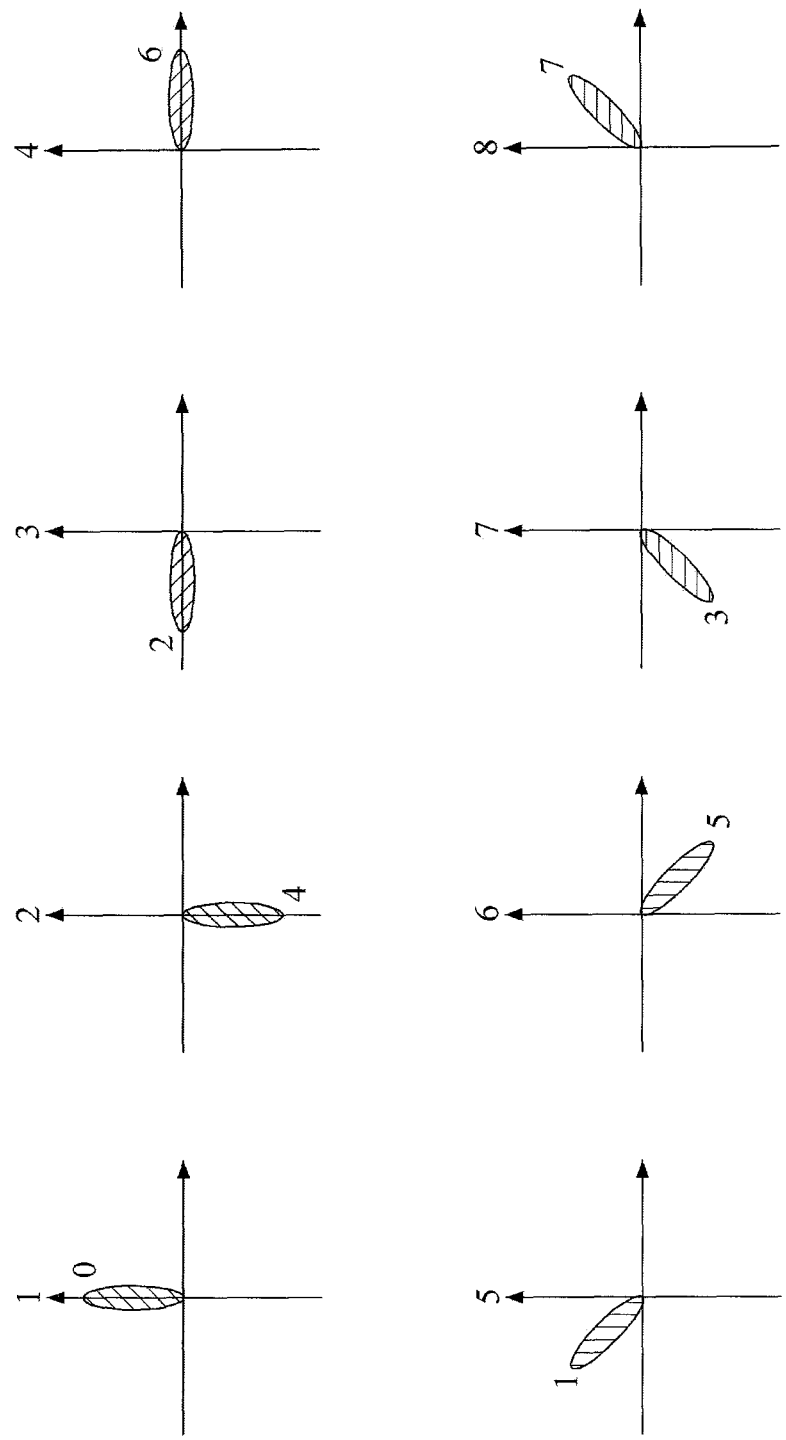
FIG. 8E is a schematic view showing the vector codebook indexed by using bit-reversal methodology by using the circular vector field.

Please also refer to FIG. 8D and FIG. 8E, in which FIG. 8D is a schematic view showing the vector codebook indexed in consecutive order by using a circular vector field, and FIG. 8E is a schematic view showing the vector codebook indexed in bit-reversal order by using a circular vector field. The maximum level of the vector codebook is used in the following description. The number located at the upper indicates the scanning order, and the number located corresponding to the vector field indicates the index of the vector field. As shown in FIG. 8D, as to the coding methodology of consecutive order, the scanning order is identical to the order of the index numbers, thus, the corresponding vector fields would circulate counterclockwise in sequence. However, as shown in FIG. 8E, as to the coding methodology of bit-reversal order, the scanning order is different from the order of the index numbers, and the vector fields are switched according to the indexes in the rightmost column of the above table.

In the embodiment mentioned in FIG. 7A to FIG. 7H, the first vector codebook and the second vector codebook are of the same coding methodology, i.e. the coding methodology in consecutive order (i.e. corresponding to FIG. 4A and FIG. 8A). However, the present invention is not limited thereto. In accordance with the other embodiments of the present invention, the first vector codebook and the second vector codebook may use different coding methodologies. For example, the first vector codebook and the second vector codebook may use different coding methodologies selected from the group composed of consecutive order, bit-reversal order, even-odd order, and random order. As a preferred embodiment, the transmitter may be indexed by using the first vector codebook with the coding methodology of consecutive order, and the receiver may be indexed by using the second vector codebook with the coding methodology of bit-reversal order. That is, in the present disclosure, the transmitter is regarded as using a Discrete Fourier Transform (DFT) codebook, and the receiver is defined as using a Fast Fourier Transform (FFT) codebook.

Figure 9:
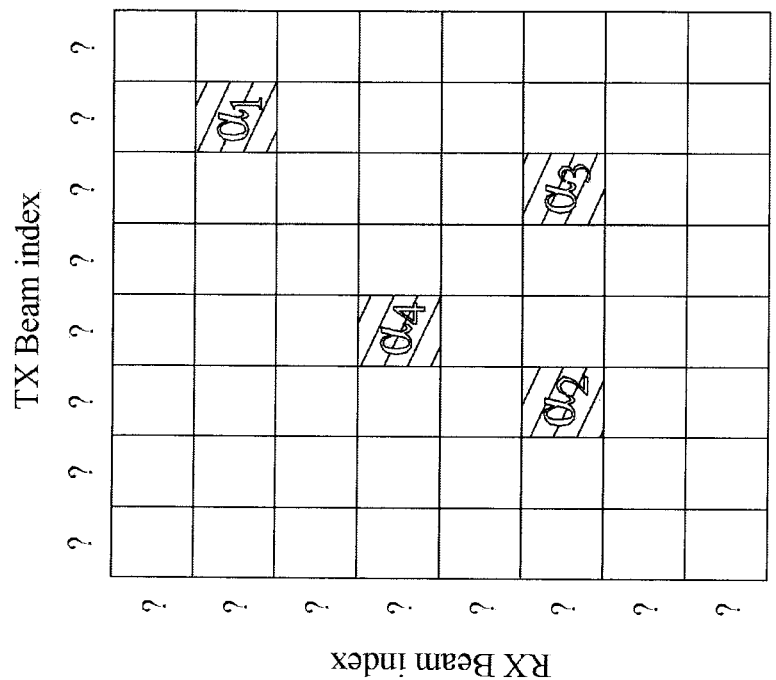
FIG. 9 is a schematic view of the power domain defined by the transmitter index and the receiver index to showing the impact of different coding methodologies to the channel estimation process.
Figure 9:
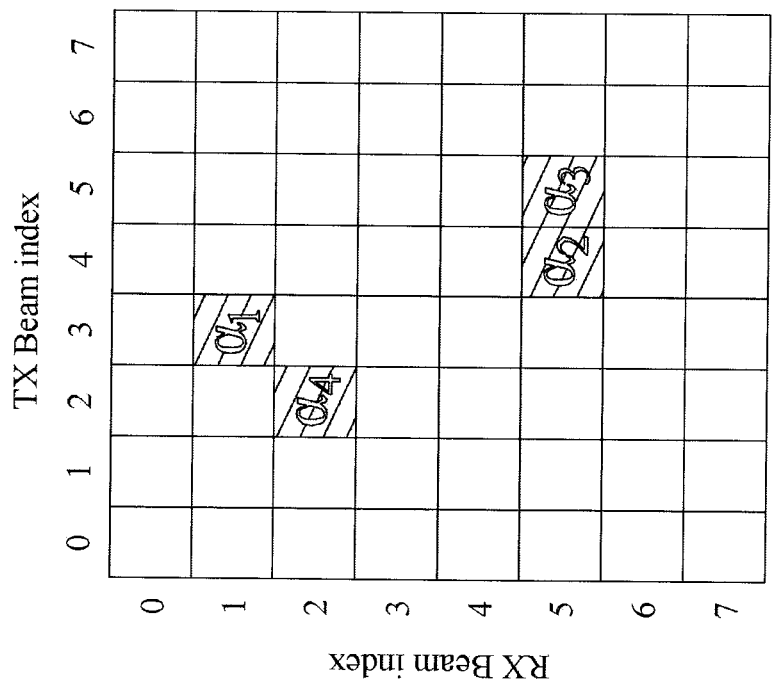

FIG. 9 is a schematic view of the channel power domain defined by the transmitter index and the receiver index to show the impact of different coding methodologies to the channel estimation process. The channel power domain in the left portion of this figure is identical to the channel power domain shown in FIG. 7A, in which both the first vector codebook and the second vector codebook use the coding methodology of consecutive order (represented as the transmitter index and the receiver index in the figure); and the right portion in this figure is an example as coding methodology is changed (the question marks represent the changed indexes). As shown in the left portion, the four sets of aligning index pairs a1, a2, a3, and a4 are substantially located in two regions (i.e. the regions labelled in dashed line). As the coding methodology is changed, the four sets of aligning index pairs are distributed in four different regions of the channel power domain Thus, by changing the coding methodology, the vector fields of the lower level may be more evenly distributed, which is helpful for giving the information of power distribution in addition to the information of the channels with greater gains. Thus, the change of coding methodology is helpful for enhancing channel estimation efficiency.

Figure 10:
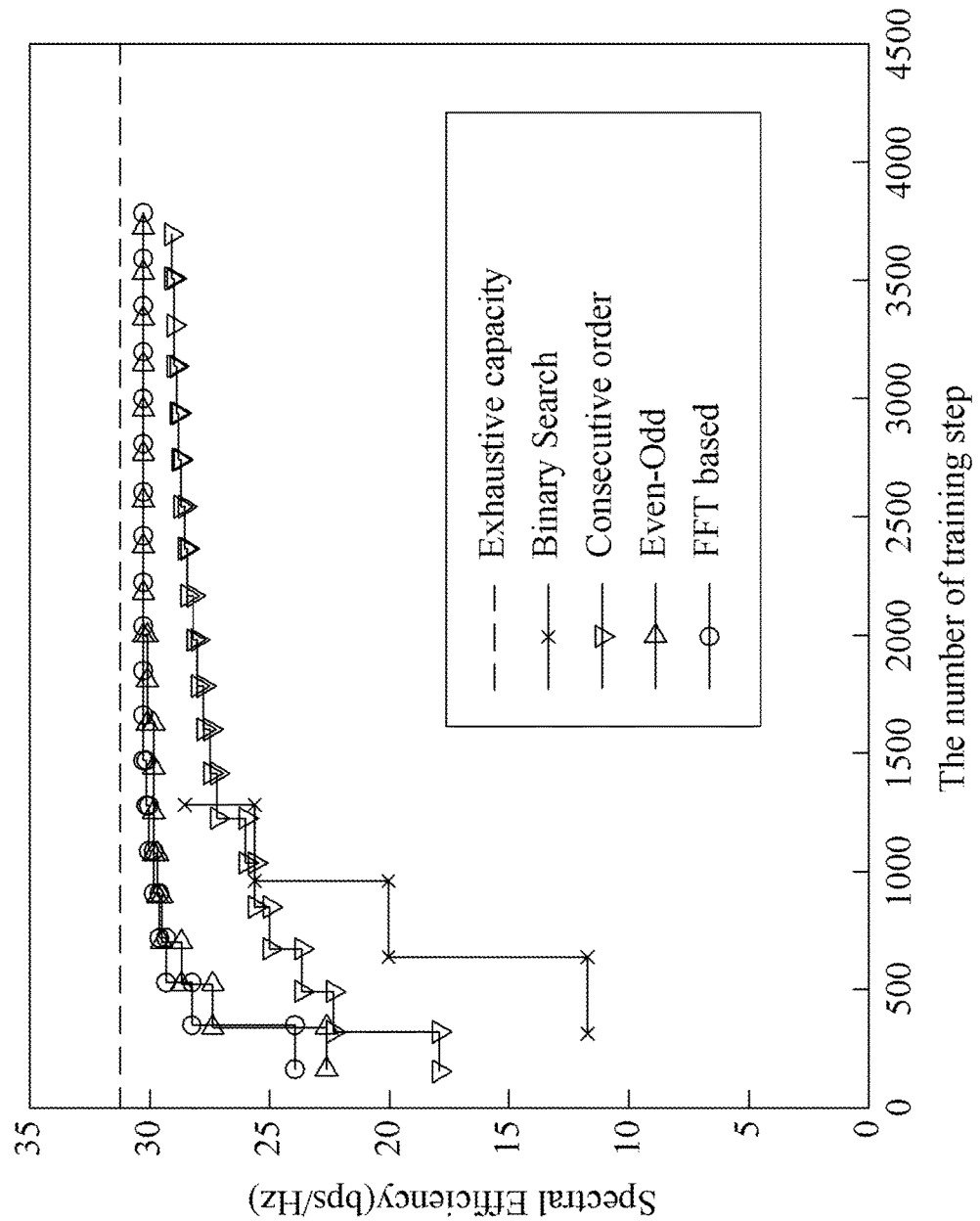
FIG. 10 is a diagram showing the simulation results of the channel estimation method in the present invention and that of the conventional channel estimation methods.

FIG. 10 is a diagram showing the simulation results of the channel estimation method in the present invention and that of the conventional channel estimation methods. The curve labelled binary search is corresponding to the conventional channel estimation method shown in FIG. 2A. The curve labelled consecutive order is corresponding to simulation result by using the beamforming method of FIG. 6 with both the transmitter and the receiver thereof using the coding methodology of consecutive order. The curve labelled even-odd is corresponding to simulation result by using the beamforming method of FIG. 6 with the transmitter and the receiver thereof using the coding methodologies of consecutive order and even-odd order, respectively. The curve labelled FFT-based (FFT indicates Fast Fourier Transform) is corresponding to simulation result by using the beamforming method of FIG. 6 with the transmitter and the receiver using the coding methodologies of consecutive order and bit-reversal order respectively. As shown, compared with the conventional channel estimation method, the channel estimation method provided in the present invention, no matter the estimation method using consecutive order channel estimation, even-odd order channel estimation, or FFT-based channel estimation, has a significant improvement within a limited number of training steps (e.g. within 500 training steps). In addition, compared with the case with both the transmitter and the receiver using the coding methodology of consecutive order (i.e. the consecutive order channel estimation), the methods of even-odd channel estimation and FFT-based channel estimation may catch up the curve of exhaustive capacity rapidly, and thus is helpful for providing precise channel information within limited training time.

As shown in FIG. 10, compared with the conventional beamforming method, which needs longer training time to achieve ideal spectral efficiency, the beamforming method provided in the present invention with the feature of identifying at least two sets of aligning vector fields with greatest gains and the corresponding aligning index pairs in each channel estimation step, is capable to improve spectral efficiency effectively so as to shorten the needed training time. In addition, the beamforming method provided in the present invention may further defines the transmitter vectors and the receiver vectors by using the vector codebooks with different coding methodologies (e.g. using the coding methodology of bit-reversal or even-odd at the receiver) to generate the hierarchical coding structures for proceeding the channel estimation steps. This method may further improve spectral efficiency, so as to shorten the time needed for the channel estimation process and reduce latency.

While the present invention has been particularly shown and described with reference to a preferred embodiment, it will be understood by those skilled in the art that various changes in form and detail may be without departing from the spirit and scope of the present invention.

What is claimed is:

1. A hierarchical beamforming method, applied to a wireless communication system which includes a transmitter and a receiver, comprising:
   (a) hierarchically coding a plurality of transmitter vectors according to a first vector codebook to generate a transmitter hierarchical coding structure, and hierarchical coding a plurality of receiver vectors according to a second vector codebook to generate a receiver hierarchical coding structure, wherein coding methodology of the second vector codebook is different from that of the first vector codebook;
   (b) switching corresponding vector fields of the transmitter and the receiver according to the transmitter hierarchical coding structure and the receiver hierarchical coding structure, respectively, and detecting corresponding gain by using the receiver;
   (c) identifying at least two pairs of aligning vector fields with greatest gains among the gains detected by the receiver, wherein each of the pairs of the aligning vector fields corresponds to an aligning index pair which includes an index of the transmitter hierarchical coding structure and an index of the receiver hierarchical coding structure; and
   (d) using the aligning index pairs to establish channels.

2. The hierarchical beamforming method of claim 1, after the step (c), further comprising:
   (e1) determining whether the step (c) has reached a maximum level of the transmitter hierarchical coding structure or the receiver hierarchical coding structure;
   (e2) if the determination of the step (e1) is yes, executing the step (d); and
   (e3) if the determination of the step (e1) is no, repeating the step (b) and the step (c) within the vector fields corresponding to the identified aligning index pairs.

3. The hierarchical beamforming method of claim 2, after the step (c) and before the step (e1), further comprising:
   (g) determining whether the transmitter or the receiver has received an aligning index pair output signal;
   (g1) if the determination of the step (g) is yes, executing the step (d); and
   (g2) if the determination of the step (g) is no, executing the step (e1).

4. The hierarchical beamforming method of claim 1, after the step (c), further comprising:
   (f1) determining whether a time spent from the step (b) to the step (c) reaches a predetermined time limit;
   (f2) if the determination of the step (f1) is yes, executing the step (d); and
   (f3) if the determination of the step (f1) is no, returning to the step (b).

5. The hierarchical beamforming method of claim 1, wherein the plurality of the transmitter vectors composes a transmitter circular vector field and the plurality of the receiver vectors composes a receiver circular vector field.

6. The hierarchical beamforming method of claim 1, wherein the coding methodologies of the first vector codebook and the second vector codebook are selected from a group composed of bit-reversal order, even-odd order, consecutive order, and random order.

7. The hierarchical beamforming method of claim 6, wherein the first vector codebook adopts the coding methodology of bit-reversal order.

8. The hierarchical beamforming method of claim 6, wherein the second vector codebook adopts the coding methodology of bit-reversal order.

9. The hierarchical beamforming method of claim 1, wherein the transmitter hierarchical coding structure and the receiver hierarchical coding structure are partitioned by using a partition parameter, and the partition parameter is 2.

10. The hierarchical beamforming method of claim 1, wherein each of the transmitter vector corresponds to a transmitter antenna, and each of the receiver vector is corresponding to a receiver antenna.

* * * * *